(12) United States Patent
Vanreusel et al.

(10) Patent No.: US 12,450,936 B2
(45) Date of Patent: Oct. 21, 2025

(54) IMAGE LOCALIZABILITY CLASSIFIER

(71) Applicant: ADOBE INC., San Jose, CA (US)

(72) Inventors: Jean-François Pierre Alain Vanreusel, Pebble Beach, CA (US); Ajay Kumar, San Jose, CA (US)

(73) Assignee: ADOBE INC., San Jose, CA (US)

( * ) Notice: Subject to any disclaimer, the term of this patent is extended or adjusted under 35 U.S.C. 154(b) by 443 days.

(21) Appl. No.: 17/520,462

(22) Filed: Nov. 5, 2021

(65) Prior Publication Data

US 2023/0143430 A1 May 11, 2023

(51) Int. Cl.
| | |
|---|---|
| *G06V 30/413* | (2022.01) |
| *G06F 18/213* | (2023.01) |
| *G06F 18/214* | (2023.01) |
| *G06F 40/166* | (2020.01) |
| *G06N 3/08* | (2023.01) |
| *G06N 7/01* | (2023.01) |
| *G06T 7/00* | (2017.01) |

(52) U.S. Cl.
CPC .......... *G06V 30/413* (2022.01); *G06F 18/213* (2023.01); *G06F 18/214* (2023.01); *G06F 40/166* (2020.01); *G06N 3/08* (2013.01); *G06N 7/01* (2023.01); *G06T 7/0002* (2013.01); *G06T 2207/20084* (2013.01); *G06T 2207/30176* (2013.01); *G06V 2201/09* (2022.01)

(58) Field of Classification Search
None
See application file for complete search history.

(56) References Cited

U.S. PATENT DOCUMENTS

| | | | | |
|---|---|---|---|---|
| 7,756,743 | B1 * | 7/2010 | Lapcevic | G06Q 30/0207 |
| | | | | 705/14.1 |
| 10,303,979 | B2 * | 5/2019 | Kraus | G06V 20/69 |
| 11,238,289 | B1 * | 2/2022 | Tao | G06N 3/08 |
| 2009/0319187 | A1 * | 12/2009 | Deeming | G06Q 30/0261 |
| | | | | 705/14.58 |
| 2011/0251897 | A1 * | 10/2011 | Litvack | G06Q 30/0275 |
| | | | | 705/14.58 |
| 2013/0282360 | A1 * | 10/2013 | Shimota | G06Q 30/0241 |
| | | | | 704/7 |
| 2014/0040039 | A1 * | 2/2014 | Gates, III | G06Q 30/0269 |
| | | | | 705/14.66 |
| 2015/0134653 | A1 * | 5/2015 | Bayer | H04N 21/4826 |
| | | | | 707/732 |
| 2017/0032424 | A1 * | 2/2017 | Cetintas | G06Q 30/0277 |

(Continued)

*Primary Examiner* — Michelle M Entezari Hausmann
(74) *Attorney, Agent, or Firm* — Shook, Hardy & Bacon L.L.P.

(57) ABSTRACT

In a computer-implemented workflow, a submission of an asset localized for a first location is received. The asset may be intended for dissemination to a second location. A trained neural network is applied to the asset to determine a probability of recommending localization of the asset for the second location. This determination can be based on a plurality of features indicating contextual aspects of a document, which are identified in accordance with a plurality of transformations performed on the asset utilizing the trained neural network. Responsive to determining that the probability satisfies a condition, such as being a percentage above a threshold value, a recommendation is provided to exclude the asset from being localized to the second location.

20 Claims, 13 Drawing Sheets

(56) References Cited

U.S. PATENT DOCUMENTS

| | | | |
|---|---|---|---|
| 2018/0025256 A1* | 1/2018 | Bai | G06F 18/2415 |
| | | | 382/229 |
| 2018/0204111 A1* | 7/2018 | Zadeh | G06V 10/764 |
| 2019/0294703 A1* | 9/2019 | Bolin | G06N 3/08 |
| 2020/0082815 A1* | 3/2020 | Haze | G10L 15/19 |
| 2020/0302239 A1* | 9/2020 | Wang | G06V 30/274 |
| 2020/0364834 A1* | 11/2020 | Ferrés | G06T 5/60 |
| 2021/0027121 A1* | 1/2021 | Zan | G06N 3/084 |
| 2021/0064920 A1* | 3/2021 | Ahn | G06F 18/213 |
| 2021/0090736 A1* | 3/2021 | Innanje | G16H 40/63 |
| 2021/0117705 A1* | 4/2021 | Liu | G06N 3/08 |
| 2021/0161487 A1* | 6/2021 | Chen | G06T 7/0012 |
| 2022/0075845 A1* | 3/2022 | Bowen | G06F 30/30 |
| 2022/0180094 A1* | 6/2022 | Dragoset | B07C 1/04 |
| 2022/0369332 A1* | 11/2022 | Wang | H04W 72/1263 |
| 2023/0368500 A1* | 11/2023 | Ma | G06V 10/82 |
| 2024/0185059 A1* | 6/2024 | Rao | G06N 3/045 |

* cited by examiner

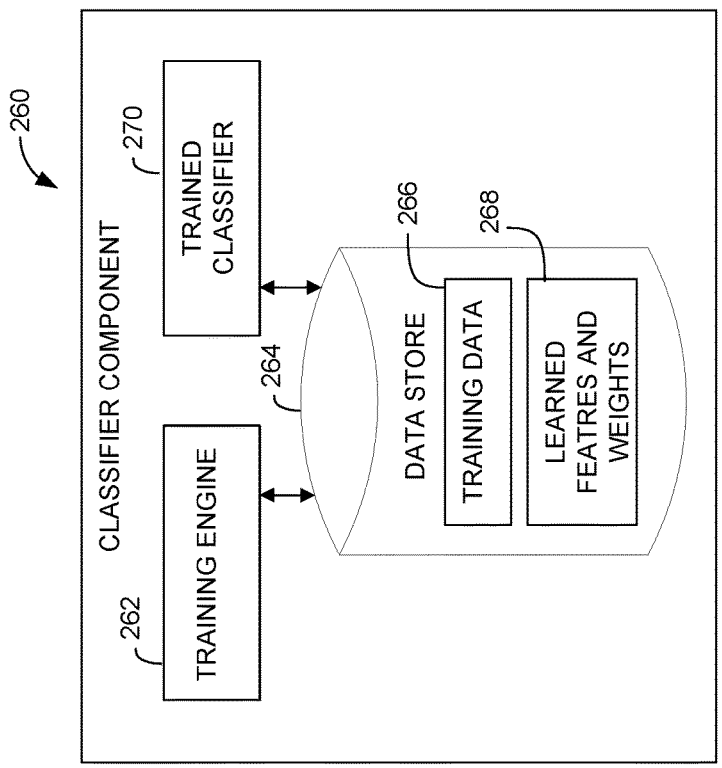
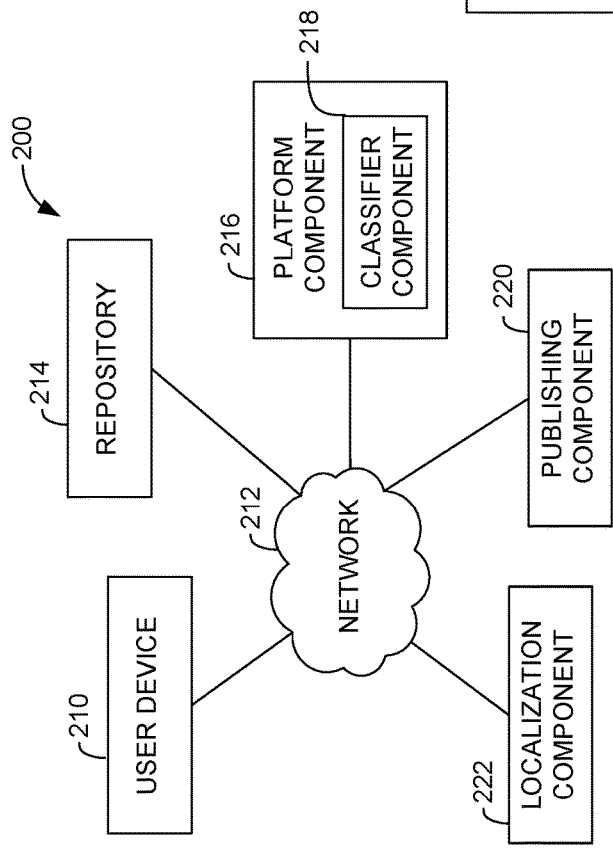
FIG. 2B
FIG. 2A

| Filename | Status | Score(%) |
|---|---|---|
| help/events/assets/adobe-logo-old.png | Not Localizable | 100.0 |
| help/events/assets/331280.jpg | Localizable | 0.01 |
| help/events/assets/331280_400.jpg | Localizable | 7.59 |
| help/events/assets/331737.jpg | Localizable | 5.95 |
| help/events/assets/331743.jpg | Localizable | 11.77 |
| help/using/assets/acs-commons.png | Not Localizable | 100.0 |
| help/aem-vvpm-integration/assets/veeva-limits.png | Localizable | 0.0 |

FIG. 5

Dashboard ▶ ild-g11n-test.en ▶ #3

Q Search       ⑦  ◁ ①  &username       ⤴ Logout

⃝ Construction #3 (17 june 2021 21:17:05)       Started 25 s ago.
Took 11 s

☐ Back to Project

☐ Status

☐ Modifications       Build Artifacts
  🗎 JobFileList.csv    544 B ☐ view
  🗎 MasterFileList.csv  2.57 KB ☐ view ☐ Console Output       Changes ☐ View build information      1. new WF images (commit: 9e1ebd7) (details)

☐ Scan log       Started by GitHub push by jsmith (2 times) ⟵ 712

☐ Timings       This run spent:
  • 5.5 s waiting;
  • 11 s build duration;
  • 17 s total from scheduled to completion.

☐ Git Build Data

☐ Rebuild       Revision: 9e1ebd72333d75c2db9199e6161897a0f1769328
Repository: git@git.corp.adobe.com:AdobeDocs/ild-g11n-test.en.git ☐ Open Blue Ocean      • refs/remotes/origin/master ☐ Embeddable Build Status

710

700

REST API       Jenkins 2.277.3

FIG. 7 test/woman.png: Not Localizable ( Score: 100.00% )

test/signup.png: Localizable ( Score: 0.00% )

IMAGE LOCALIZABILITY CLASSIFIER

BACKGROUND

In many cases, entities such as large companies or other organizations will produce or publish corporate documentation or other information issued by the entity. The documentation may include assets, such as images. Oftentimes, a high volume of assets may be produced, on a rolling basis, with constant production and updates of the assets. In other words, the authoring and publishing of documentation including assets has become practically continuous. Certain assets also need to be "localized" for various locations or divisions, for example based on language or geography. The process of identifying the correct assets for localizing can cause backlogs in the continuous publishing of documentation. Conventional systems may attempt to identify assets for localization based on the presence of text, for example using an optical character recognition (OCR) process. While OCR systems perform well with pure documents, they often misclassify assets for localization because (1) they fail to detect the presence of text (due to elements such as font color, text size, orientation and background color) and (2) ignore the context in which text is displayed. As such, in addition to inaccurately identifying assets for localization, such approaches are slow and inefficient, and they can cause a bottleneck in an entity's workflow of issuing localized documentation.

SUMMARY

Embodiments of the present disclosure are directed towards training and implementing a classifier to accurately classify whether assets should be localized. In some embodiments, a Convolutional Neural Network (CNN)-based classifier can be used to avoid or remove assets that do not need localization from the localization process. A CNN-based classifier can accurately determine whether an asset should be localized, meaning whether its text, symbols, or other information should be converted from a first language or location, in order to fit a second (or several other) languages or locations. A classifier can be used within a workflow to classify assets based on their need for localization.

In embodiments, the classifier has been trained using thousands of images, and the classifier can output a probability indicating whether each input asset or image should be subject to a localization process. For example, the classifier can identify assets to be removed or omitted from the localization portion of a workflow based on context determined by the trained classifier. The classifier can be trained to identify assets that contain logos or images of text, such as on clothing or on a storefront, that should not be localized. The classifier can generate a report of whether each input image should be localized or not and, thereafter, batch certain assets for localization according to the report. Batching can be based on the language needed for localization, or the respective destinations for the assets.

BRIEF DESCRIPTION OF THE DRAWINGS

FIG. 2A depicts examples of components, which can be used with some implementations of the present disclosure, in accordance with various embodiments.

FIG. 2B depicts examples of components, which can be used with some implementations of the present disclosure, in accordance with various embodiments.

FIG. 5 depicts an example of output information associated with some implementations of the present disclosure, in accordance with various embodiments.

FIG. 7 illustrates an example of a user interface in accordance with embodiments of the present disclosure.

DETAILED DESCRIPTION

Figure 1:
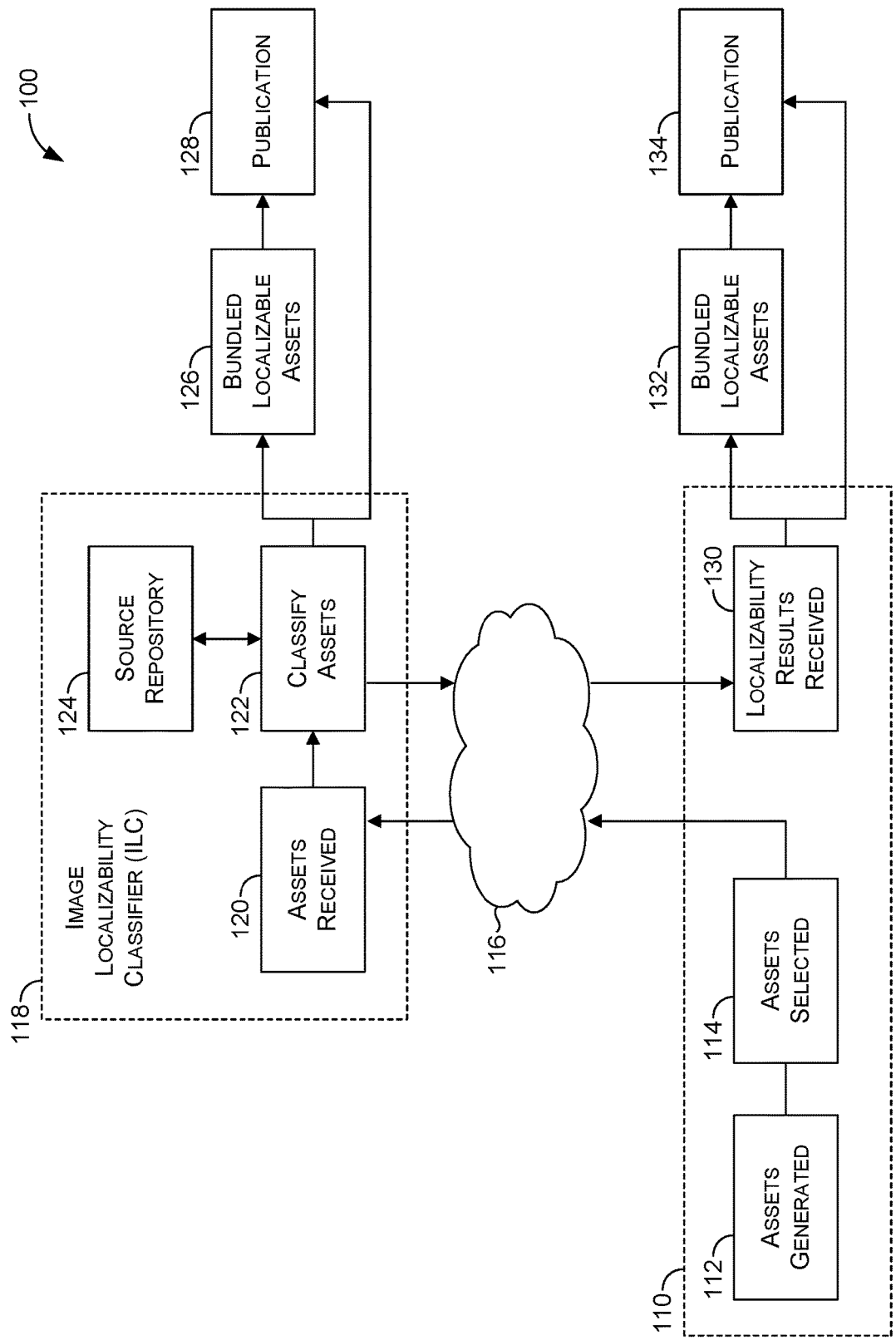
FIG. 1 depicts an example configuration of a workflow in which some implementations of the present disclosure can be employed, in accordance with various embodiments.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Oftentimes, an organization such as a business or other group will create numerous assets, such as images within documentation relating to the organization and its products. For example, organizations may generate or update their webpages, advertisements, or other information by creating assets (e.g., images). The information can be part of an automated workflow, where the information is pushed out to various locations or recipients as soon as it is ready. In other words, modern workflows are agile and on-going, with a near-constant need for localization of information. In an automated environment, the localization process can be cumbersome or over-burdened, in some cases because the assets identified for localization are over-inclusive and/or inaccurate. It can be too time consuming or inefficient to identify all assets, or all assets containing text, for a localization process.

Conventional automated workflows tend to include all assets for localization, which can slow or halt the continuous dissemination of documentation including the assets by the organization. Some conventional workflows may use OCR to try to identify text within assets, but this approach has its own limitations due to text size, color and background color, for example. It also does not consider or use the context of the text to classify assets for localization. At a global company, content may be created and updated at a fast pace. Generally, conventional systems direct too much material for localization compared to the amount of material that should be subject to localization, substantially slowing down an entity's workflow.

Embodiments described herein provide systems and methods for accurately classifying assets for localization. In some cases, documentation may be submitted to a system (as changes or comments to repository system, for example). The documentation may include multiple embedded assets, such as images. In some cases the images are stored image files associated with submitted documentation. A neural-network-based classifier can be trained to analyze input assets and output a probability of recommending localization for the asset. For example, a Convolutional Neural Network (CNN)-based classifier can be trained to extract or identify features from input assets. The classifier can identify features that are useful, or provide context, to determining whether assets should be localized. The assets can be analyzed as images with pixel dimensions. The classifier relies on hidden layers, which transform the images and enable feature information to be added and stored. The transformations can reduce the pixel dimensions of the images in the height and width directions, while increasing the depth layer, which allows space for the feature information to be encoded. A feature layer can then be reduced to a vector and used to generate an output probability between zero and one, which indicates whether an image is likely localizable or not.

Feature information for an asset can be information used to show or determine context or other data to determine if the asset should be submitted for localization. For example, feature information can identify aspects or content of the assets, such as logos or people. In some cases, feature information could relate to whether an asset contains certain objects in context, such as marketing or product information. The classifier can determine features to indicate the objects and contexts that are useful to determining whether the asset should be localized or not. The classifier may identify numerous features (or weights of features) to be determined and stored, and used to generate a probability indicating that localization is recommended. A classifier may be trained to determine features that indicate items of clothing, storefronts, or logos, for example, which may not support a recommendation for localization.

For instance, features can be used to analyze the context of an asset. A classifier may learn a photo of a group of people should not be submitted for localization. For example, assume text is found on the clothing of the people in the photo, or in tattoos on the skin of people in the photo. Embodiments described herein can determine the asset is not appropriate for submitting for localization, using features that capture the context or localizability of the asset. On the other hand, conventional systems may detect text in the photo and submit it for localization. As another example, a classifier can be trained to determine features relating to angles or spatial layout, which may be used by the system to remove assets from localization that include images of signage or other scenes that will not support a recommendation for localization. The classifier can be trained to determine whether logos, or certain logos, should be subject to localization, depending on context, for example.

Assets, as used herein, may refer to images, such as images associated with webpages and other materials that relate to or come from an organization. For example, an organization's webpages, reports, marketing materials, forms, product documentation and other documents or information can include assets, such as images, that may be created or updated by an entity. In some cases, a single user can be an entity and create assets (including updates) for potential localization. In embodiments, a system automatically initiates the creation or updating of assets and they are input into a workflow automatically, triggering the classification described herein. Assets can include, in some cases, images associated with programs, applications, and/or interfaces, for example. Assets may relate to advertisements, or internal documentation regarding benefits or compliance with rules or regulations, as additional examples. Assets may also be associated with notifications to employees or customers, warranties, terms of service, or any other documentation that may be intended for communication in more than one location or language.

A classifier can be trained to determine features that are useful to determining localization recommendations, as stated above. A classifier, such as a neural-network-based classifier, can also be trained to apply certain weights to the features. For example, numerous features can be learned and extracted to indicate the context of assets and to indicate whether shapes within the assets mean the assets should be subject to localization. Two or more features that both indicate context in favor of non-localization can be weighted differently. For example, the classifier may determine a lack of text is to be weighted more in favor of non-localizability than text in a third-party logo, which may also favor non-localizability. For example, a CNN-based classifier can identify and record features learned over time to be indicative of whether localization is recommended for an asset.

Advantageously, as described herein, aa classifier removes images from the localization process. In particular, a classifier can determine one or several images that should not be processed to adjust the images for a new location or language, for example. Reducing the number of images from the localization process can allow more assets to directly proceed to publication, instead being held in a workflow while waiting for localized versions of images, thereby improving an organization's workflow. Conventional systems would require a human to evaluate each image to determine if localization should occur. Alternatively, conventional systems would use OCR to identify every asset with text or characters. These conventional systems would submit or recommend every image with text for localization. This approach is over-inclusive and inaccurate. In contrast to such conventional systems, embodiments described herein include a neural-network-based classifier that accurately excludes many images from the localization process. Accordingly, the classifier can avoid numerous images being unnecessarily considered or treated for localization, preventing a bottleneck in a workflow.

FIG. 1 depicts an example configuration of a workflow 100 in which some implementations of the present disclosure can be employed, in accordance with various embodiments. The workflow 100 can be a content creation and publishing process, such as an automated and continuous process used by an organization, or a portion of such a process. For example, workflow 100 can be part of a continuous integration, continuous delivery (CI/CD) process. Workflow 100 is merely an illustration of possible components or aspects of a workflow, and the functions illustrated can take place in various locations. In this example, a user device 110 is shown, which could be a computing device used by an author or creator of assets. User device 110 can represent multiple devices associated with an organization and involved in generating assets, in communication with each other or a network.

User device 110 in FIG. 1 includes components such as an asset generating component 112 and an asset selection component 114. Asset generating component 112 can generate or receive assets in a workflow 100. Asset selection component 114 can be provided by a program or system associated with a workflow 100, such as a client or enterprise program running on a user device 110. An asset selection component 114 can be used to identify or capture assets to be analyzed for potential localization needs. In some cases, after assets have been selected at an asset selection component 114 of the user device 100, the assets are communicated or transferred using a network 116 to an image localizability classifier (ILC) component 118. For example, an ILC component 118 can be a cloud-based component accessed over a network 116, such as the internet. In other cases, an ILC component 118 may be included as part of a user device 110 or accessible locally or via an intranet or other connection.

ILC component 118 can receive assets, for example at asset receiving component 120, shown in FIG. 1. For example, embodiments of an ILC, such as ILC component 118, are discussed in more detail with respect to FIG. 3, below. In some cases, a user of user device 110 can submit new or updated assets to a database or repository in a workflow 100. For example, an author of corporate documentation could pull a master copy of code or documentation, such as an upstream Git master. The author can make changes such as adding assets or other information, and then push to or synchronize with a repository. In an embodiment, an author or creator of assets submits changes to a Git repository, for example using a push request. Each time the author submits information such as changes, a process is triggered for all assets associated with the changes to be automatically reviewed by a classifier, such as ILC component 118. In embodiments, a creator of assets, including updates, can push or transmit assets or indications of assets to an ILC component 118.

ILC component 118 can include an asset classifying component 122, in embodiments. The functionality of an asset classifying component 122 is discussed in more detail below, for example with respect to FIGS. 3 and 4. At a high level, an asset classifying component 122 can automatically determine probabilities that indicate whether each asset should be localized or not. In some cases, the determined probabilities, or another indication of whether each asset should be subject to localization, is transmitted to a source repository component 124. For example, a file or other communication can provide an identification of each asset, and a value indicating whether each asset should be localized or not, to the source repository component 124. In embodiments, a yes or no value, or a value of one or zero, can be determined from the probabilities and stored in the source repository component 124. In some cases, a source repository component 124 can be checked when assets are received, in case any of the assets have already been classified.

After ILC component 118 classifies assets. The ILC component can also automatically batch and submit assets for localization, if the assets have a classification probability below a certain amount. For example, assets with a probability of 50% or lower may be recommended for localization and can be separated and sent for localization. A bundled localizable assets component 126 can bundle assets by language or by the end-destination locations of the assets, such as countries or branch offices of an organization. The bundled assets can be localized and then proceed to a publication component 128, as shown in FIG. 1. Also as shown in FIG. 1, assets determined not to be recommended for localization can be provided to the publication component 128 without localizing the assets. For example, assets with a localization probability below 10% or 20%, or 50%, can automatically be pushed to publication, without being subject to any localization.

Alternatively, an ILC component 118 can provide results back to a user device 110. For example, a results received component 130 can receive indications of whether each asset should be localized. A user device 110 can bundle and submit localizable assets as shown at second bundled localizable assets component 132. For instance, user device 110 can run a system including automatically submitting all assets identified as appropriate for localization. As an example, assets with a probability under 60% can be identified as recommended for localization, so these assets can be bundled by destination language or country and treated for localization. After localization, assets can be submitted to a third publication component 134. In embodiments, the assets with a higher probability, or those indicated as "no" or "0" for localization, are sent to the third publication component 134. These assets are able to bypass the localization process, because the ILC component 118 is able to identify these assets as appropriate for publication without localization.

FIG. 2A illustrates a diagram 200 of examples of components capable of use with embodiments. A user device component 210 can be a workstation or other computing device with access to a workflow, or able to submit changes or documentation for publication. For example, a user device component 210 can communicate, using a network 212, with a system or devices for facilitating a publication workflow. A network 212 can be a cloud network or other type of communications network. A user of a user device component 210 can submit new or revised documentation intended for publication or distribution via the network 212. The documentation can be received or indicated by an update to a repository component 214. In some cases, a workflow automatically receives notifications of submissions to a repository component 214, or a user of a user device component 210 (or another device) may pull or request submissions to a repository component 214.

In one example, a user submits marketing and safety documentation by indicating a change to the repository component 214. In response, a platform component 216 may retrieve the submitted documentation, including any associated or embedded assets, such as all image files related to the documentation. The assets may include photographs, charts, and other images, such as graphics of the company logo or other icons. As shown in FIG. 2A, a platform component 216 can include a classifier component 218. In some cases, a platform component 216 accesses a remote classifier component 218, or a distributed classifier component 218. A classifier component 218 can include, or access, various stored data, as discussed with respect to FIG. 2B.

The classifier component 218 in FIG. 2A can perform an image localization classification job, for example as discussed below regarding FIG. 3. For example, the classifier component 218 can be trained to determine which assets are recommended to be subject to a localization process or not. A classifier component 218 is able to exclude, or recommend excluding, assets from the localization process, in embodiments. If a classifier component 218 returns an indication that an asset does not require localization, the asset can be pushed to a publishing component 220. In some cases, a platform component 216 automatically sends the assets to a publishing component 220, if localization is not recommended. In some cases, a user of a user device component 210 receives scores or results indicating whether localization is recommended, which the user device component 210 may use to automatically trigger pushing assets to a publishing component 220. If the classifier component 218 recommends one or more assets for localization, the assets can be batched and transmitted to a localization component 222.

The classifier component is able to determine assets that can bypass the localization component 222 and proceed directly to a publishing component 220. This prevents such assets from waiting for a localization determination and delaying all documentation linked to the assets from progressing to publication. At a localization component 220, one or more processes can occur to localize an image intended for a first location into an image for a second location, such as updating the language, symbols, or references, or adjusting for customs, preferences, or guidelines. As one example, the symbols for currency may need to be changed for images that will be embedded in, or used with, documentation in a different geographic area. In another example, a company's phone number or website may be provided differently in different geographic areas.

FIG. 2B illustrates an example of a classifier component 260. Classifier component 260 in FIG. 2B can be an ILC component 118 as shown in FIG. 1, which can perform an ILC job 316 as shown in FIG. 3, in embodiments. FIG. 2B shows a classifier component 260 including a training engine component 262, in communication with a data store component 264. A data store component 264 can be included with the other components of a classifier component 260, on one or more devices, or a data store component 264 can be accessed remotely over a network connection. The data store component 264, as shown in FIG. 2B, can include a training data component 266.

In one example, hundreds or thousands of images can be used as training data by a training engine component 262, in order to analyze features of each image using hidden layers, as described herein. In some cases, a classifier component 260 includes, at data store component 264, a learned features and weights component 268. The learned features and weights component 268 may indicate the various features the classifier component 260 has learned to extract from images in order to determine whether localization is recommended or not. For example, the learned features and weights component 268 may indicate various features from which a set of features will be used for each image, because the features have been determined by the classifier component 260 to have some bearing on whether localization should occur. In some cases, up to 64 features are utilized for each image.

A training data component 266 may also include hundreds or thousands of images used for verification or error-reduction of the classifier component 260. The learned features and weights component 268 can be used by a trained classifier component 270 to provide scores for each image indicating whether localization is recommended or not. The trained classifier component 270 can be used by a classifier component 260 to transform images as shown in FIG. 4, to determine the features used by the system to provide scores. As one example, the trained classifier component 270 is a neural-network-based classifier. The trained classifier component 270 is trained to determine features of images using hidden layers, in one example. A trained classifier component 270 can comprise a neural network that has been trained (e.g., using thousands of images) to extract and store features of the images that are relevant to whether each image should be localized or not. The trained classifier component 270 can extract features of new images that are relevant to whether the new images should be localized or not. The trained classifier component 270 utilizes hidden layers, and one or more fully-connected layers, to determine a vector encoding the features, in embodiments. In embodiments, the trained classifier component 270 can perform an image localizability classifier job, such as ILC job 316 in FIG. 3.

Figure 3:
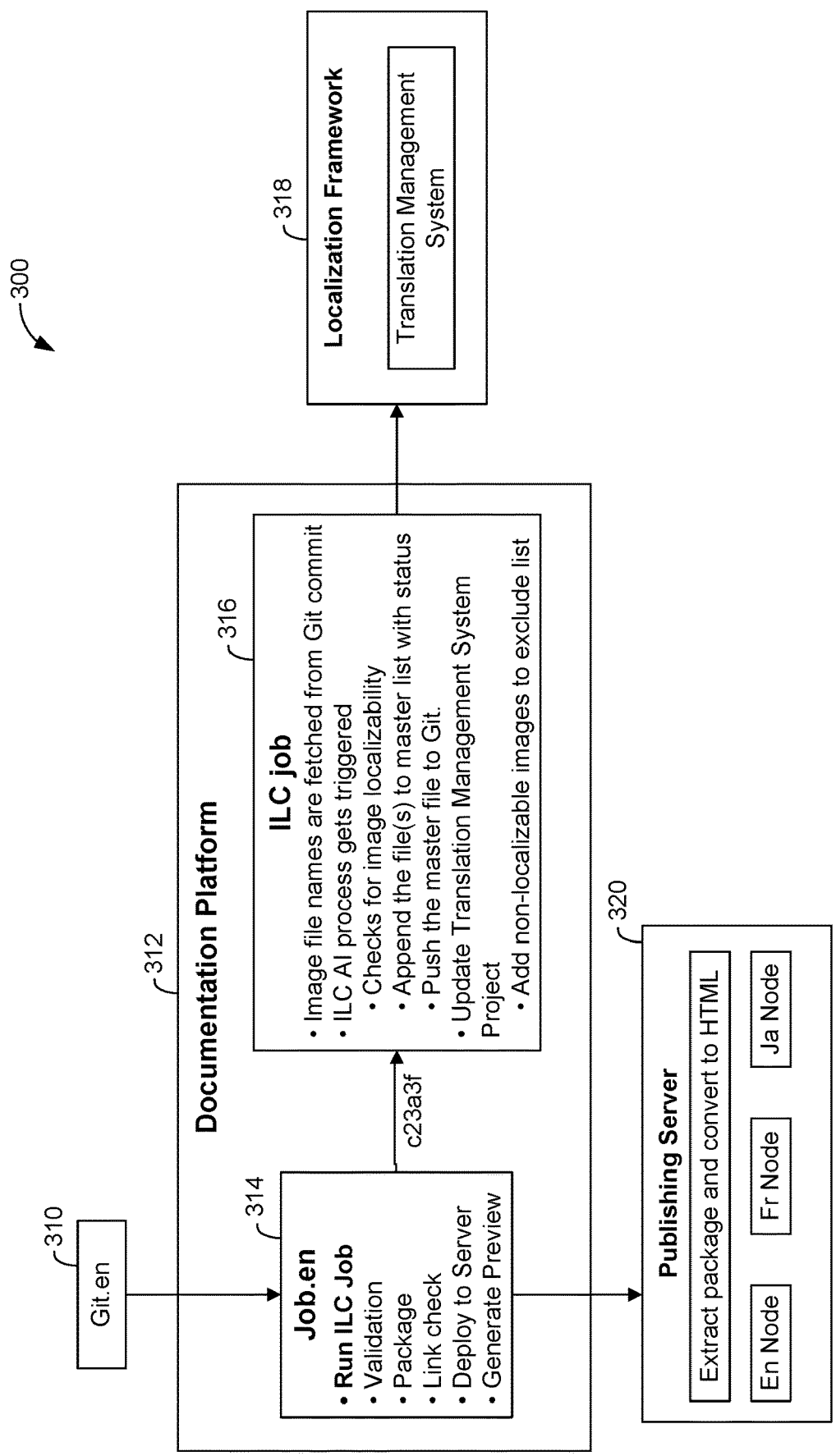
FIG. 3 depicts an example configuration of a workflow in which some implementations of the present disclosure can be employed, in accordance with various embodiments.
Figure 4:
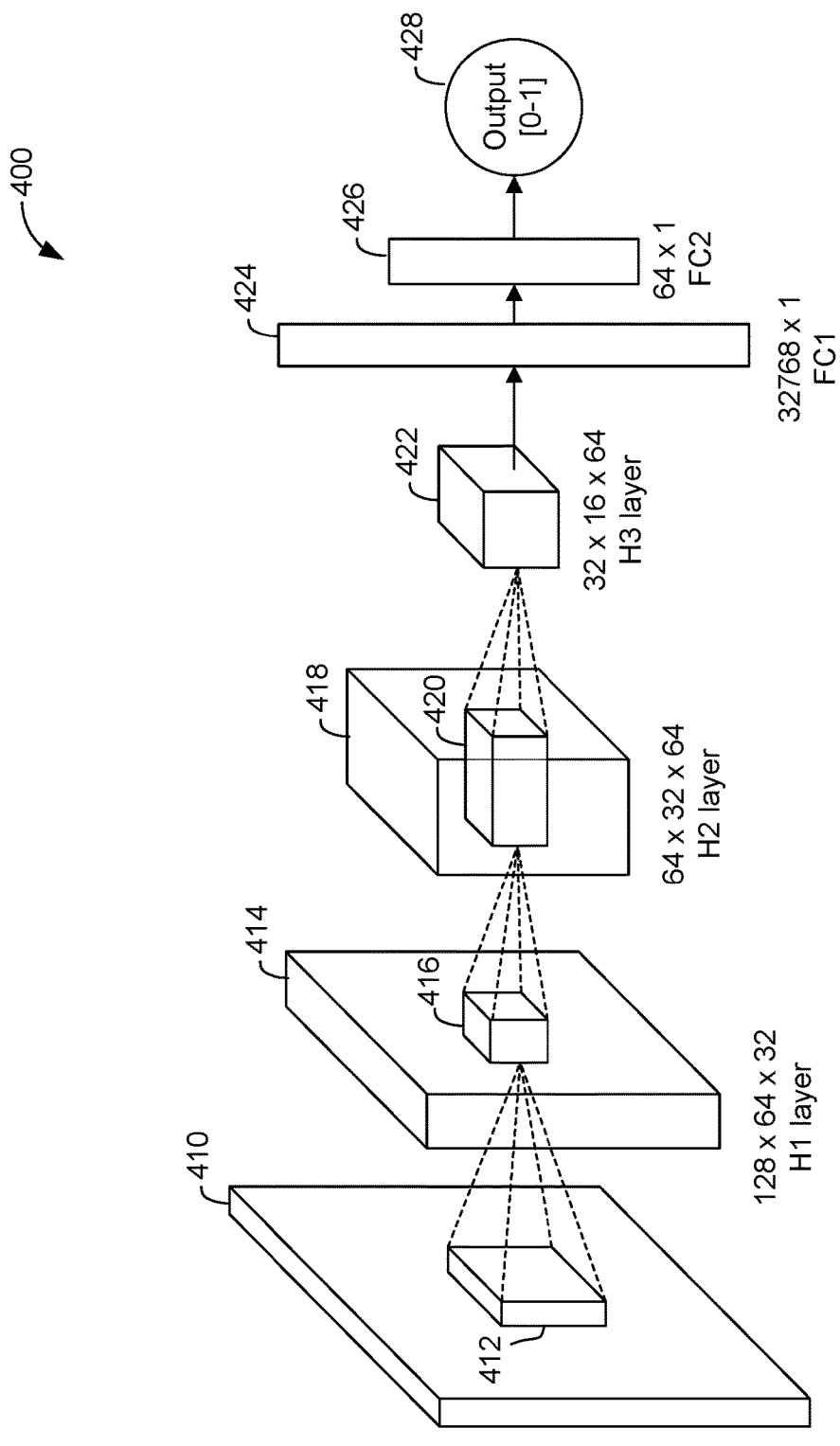
FIG. 4 depicts an example diagram showing a configuration of layers, which can be used with some implementations of the present disclosure, in accordance with various embodiments.

Turning to FIG. 3, an example of configuration of a workflow 300 is shown, in which some implementations of the present disclosure can be employed. FIG. 3 includes a Git.en component 310, which can be an English-language repository that receives assets including updates or changes to assets. For example, Git.en component 310 can receive an indication of assets to be processed from a user device 110 in FIG. 1, or any device that can access the Git.en component 310. This can be in the form of a "GitHub push" in a system triggered by a user or a workflow component. In some cases, a Git.en component 310 can be accessed over a network 116 in FIG. 1 in order to access an ILC component 118. As one example, an ILC component 118 can be embodied on a documentation platform 312, shown in FIG. 3.

Continuing with FIG. 3, a documentation platform 312 can host or include a Job.en component 314. Job.en component 314 can be automatically activated or triggered by updates or changes to a Git.en component 310. For example, Job.en component 314 at documentation platform 312 can represent a new job to be performed as part of automatically and continuously generating or updating assets. As one example, an author at a company can generate a set of ten new assets or pages to be disseminated to other parts of the company. The author can submit indications of the new assets to the Git.en component 310, causing Job.en component 314 to be automatically generated by documentation platform 312. In embodiments, documentation platform 312 comprises a server performing automation or workflow functions. The documentation platform 312 can be hosted or embodied on one device, or distributed among more than one server device. The documentation platform 212 can automatically generate an ILC job 316 based on the Job.en component 314. In embodiments, documentation platform 312 can communicate with another machine or server that hosts a deep learning image classifier as described herein, by calling the machine with a script. The script can cause a classifying process to be performed, including pushing back or implementing the recommendations in order to continue an automated workflow, for example. In embodiments, an API can be called and the API will return whether or not images are localizable.

As shown in FIG. 3, one aspect or task of the example Job.en component 314 is a command or instruction to run or perform an ILC job. This job is reflected at ILC job 316 in FIG. 3. In this example, an ILC job 316 can include one or more steps to be performed by a documentation platform 312. An ILC job 316 can be run or be carried out by an ILC component 118 as shown in FIG. 1, for instance. The ILC job 316 in FIG. 3 indicates steps to be performed, such as image file names fetched from a Git commit. This step can include each asset being treated as an image file for purposes of determining whether localization is recommended or appropriate. The image files can reflect new or updated assets generated by an organization.

As shown in FIG. 3, an ILC job 316 includes an ILC artificial intelligence (AI) process being triggered. This process can be performed by an ILC component 118 as shown in FIG. 1. The process can include checking each image for localizability. This check can use a CNN-based classifier developed using deep learning techniques, as described herein. One or more files can be appended to a master list, which indicates the status of each asset with respect to localization. The master file can then be pushed to Git, such as a Git.en component 310 or another location. Also as shown at ILC job 316, a Translation Management System project can be updated to exclude assets that do not merit localization. For example, non-localizable assets can be added to an exclude file or list, so that the assets can bypass the localization process.

As shown in FIG. 3, a documentation platform 312 can be in communication with a localization framework 318. In some cases, a localization framework 318 can represent a destination for bundled localizable assets, such as those handled by bundled localizable assets components 128, 132 in FIG. 1. A Translation Management System can be used by a localization framework 318 to provide an automated process for submitting requests relating to modeling over a network, such as a cloud network (e.g., network 116 in FIG. 1). A master list can be used to identify what assets were localized or not, or recommended to be localized or not. In some cases, a master list can be overridden or updated. For example, a preference can be stored for certain types of assets or other criteria to be recommended for localization or not, regardless of the results generated by the classifier. In some cases, the master list results can be automatically implemented by a system to facilitate a workflow, such as workflow 300, and any preferences can be automatically applied.

Continuing with FIG. 3, a publishing server 320 is shown. A publishing server 320 can extract a package and convert generated assets into HTML. As shown in FIG. 3, a publishing server 320 can include or access various nodes that correspond to localized assets, such as English, French, and Japanese nodes, as shown in FIG. 3. Publishing server 320 can be hosted on a server device or distributed among two or more devices. A publishing server 320 can host or embody publication components 128, 134, shown in FIG. 1. In some cases, a workflow 300 as shown in FIG. 3 can be triggered by an API request, where the API request includes or is based on communications with a Git.en component 310. In some cases, an API request can be used to initiate an ILC job, such as ILC job 316 in FIG. 3. In embodiments, other methods of triggering an ILC job 316 can be used, for example based on flagged or pushed assets, or assets identified as new in a workflow 100. For example, some embodiments can include systems or workflows that identify assets for review by analyzing changes to one repository (such as an English-language repository) that may be candidates for localization.

It should be appreciated that the Git.en component 310 shown in FIG. 3 can be a Git component associated with any language or location as the base or starting point for determining localization. For example, a French Git repository could be used as the initial or starting Git component, with localization into English being recommended for certain assets. Numerous other languages, including dialects or other local customizations, can be used for the base Git component, with localization needs determined using an ILC job as described above. As shown in FIG. 3, a unique identification, such as a hash identification (e.g., "c23a3f"), can be generated by a Git system for any comment or change made by users, such as a job submitted to a documentation platform 312.

In embodiments, each asset is input as an image into an ILC component, such as ILC component 118 in FIG. 1, to perform an ILC job. The ILC component can train and implement a CNN-based classifier to transform images in order to determine features relevant to localization needs. The images are transformed to utilize hidden layers, and the final hidden layer is transformed into fully-connected layers. The fully-connected layers can be used to generate a vector. The vector can be used with a sigmoid function to obtain a probability in between one and zero for each asset, where a probability close to zero indicates a high likelihood that the asset should be or needs to be localized. A probability close to one may indicate a low likelihood that the asset should be localized.

FIG. 4 depicts a diagram showing an example configuration 400 of layers, such as the hidden and fully-connected layers, which can be used with some implementations of the present disclosure, in accordance with various embodiments. Assets can be submitted in a workflow, such as workflow 100. Each asset can be analyzed by treating it as an image at an input layer 410. The image of an asset at the input layer 410 can have pixel dimensions and a depth. For example, an image representing an asset at input layer 410 may have dimensions of 256 by 128 pixels, with a depth of three. The depth of three at input layer 410 can correspond to the three color values or channels available for each pixel, such as red, green, and blue (RGB). In FIG. 4, at input layer 410, the depth of three bytes or values is illustrated as a first feature layer 412 of the image.

As shown in FIG. 4, a first transformation occurs when an image at input layer 410 is transformed into first hidden layer 414. When the image becomes first hidden layer 414, the image is reduced in size in the height and width dimensions. For example, the image can be transformed into having 128 pixels by 64 pixels, as shown at first hidden layer 414 in FIG. 4. Therefore, the image is reduced in pixel size, from 256 pixels in width to 128 pixels in width, and from 128 pixels in height to 64 pixels in height, in this example. When the image is transformed into first hidden layer 414 with reduced pixel dimensions, the second feature layer 416 has more space to store more information. For example, at first hidden layer 414 in FIG. 4, the second feature layer 414 now has a depth of 32 bytes. The increased size of the second feature layer 414, compared to the first feature layer 412, enables more information about the image to be determined and stored in the second feature layer 414.

As one example, during a first transformation to a first hidden layer 414, a CNN-based classifier can detect features in the pixel information of the image and store this information in second feature layer 416. The classifier may be trained to determine people, shapes, and other aspects of images that can provide context useful for the classifier to decide if localization is needed or not. In embodiments, a classifier may identify shapes using features as context, to determine if each shapes within an asset likely merits localization or not. In one example, a logo may be identified in the image and the second feature layer 416 may identify that the logo found at certain pixels does not merit localization due to its context. The CNN-based classifier can be trained using many images where localizability has previously been determined. The classifier can learn the correct features to extract, and how to weigh those features, in order to reach reliable conclusions on whether localization is appropriate or not. In some cases, thousands of baseline assets can be used to train a classifier so that it can act on other assets with accurate outputs. In one example, four thousand assets with known localization statuses can be used to train a classifier, and another thousand can be used as a validation set to verify or refine the classifier.

Continuing with FIG. 4, a second transformation is shown where the image is transformed from a first hidden layer 414 into a second hidden layer 418. In this example, at the second hidden layer 418, the pixel dimensions in the height and width directions have again been reduced. The image at hidden layer 418 has a width of 64 pixels and height of 32 pixels, for example. This again allows an increase in the feature layer, such that the second feature layer 416 in the first hidden layer 414 is increased at the second hidden layer 418. The third feature layer 420 at the second hidden layer 418 can have a depth of 64 bytes, or another increased depth, which can store even more feature information that is relevant to localization needs.

As shown in FIG. 4, another transformation can occur whereby a second hidden layer 418 is transformed into a third hidden layer 422. At the third hidden layer 422, the entire third hidden layer 422 can be a fourth feature layer. The dimensions of the third hidden layer 422 can be, for example, 32 by 16 pixels, with 64 bytes of depth. The third hidden layer 422 can then be transformed into a first fully-connected layer 424, as shown in FIG. 4.

The classifier can utilize or rely on the first fully-connected layer 424 from the third hidden layer 422. When the dimensions of the third hidden layer 422 in the example in FIG. 4 are multiplied, the result is 32,768. In the example in FIG. 4, the first fully-connected layer 424 has dimensions of 32,768 by one, for example. In another transformation, a classifier converts the first fully-connected layer 424 into a second fully-connected layer 426, with dimensions of 64 by one, in this example. The fully-connected layers described herein can be indicated or represented by a vector connecting neurons or nodes in a network, where the feature information determined by the classifier is captured by a vector traversing the nodes in a layer.

In embodiments, the assets at issue (including any associated assets identified by the system that must also be analyzed) are uniform in size or are adjusted to be uniform in size. As the dimensions of the image are decreased in the hidden layers shown in FIG. 4, this allows room for the CNN to learn features and store information. One or more feature layers and/or fully-connected layers can increase in length, for example, as the algorithm learns features associated with images, as shown in FIG. 4. Each layer can correspond to a convolution of a trained CNN-based classifier, which can extract features at a higher level as the classifier proceeds with each layer.

As shown, a first fully-connected layer 424 can have dimensions of 32,768×1, which can be reduced to 64×1, as shown. The 64 features or neurons represented by the second fully-connected layer 426 can be neurons used in the neural network to record information that is relevant to the localization needs of the asset. A vector can intersect all of the neurons or nodes in a layer to represent 64 features, for example. In embodiments, other amounts of features can be used to determine the localization probabilities. The CNN-based classifier can learn the specific transformations to make to an image representing an asset, in order to extract the correct features and weights for those features, to achieve accurate probabilities. These learned transformations, for example as represented in FIG. 4, can then be applied to new assets in order to classify the new assets as recommended for localization or not. Although a different amount of layers can be used in embodiments, or different dimensions or values can be used for the layers, the examples described herein have achieved relatively accurate probabilities with respect to classifying assets for localization.

In the technological field of automated workflows with localization needs, conventional systems are generally over-inclusive, because they do not exclude any assets from localization, or they include all assets with text, for example. In the context of an automated classifier, such as a CNN-based classifier, an issue can be failing to be general enough to accurately analyze new images after training. In other words, a trained classifier may be too specific to the training images to be highly accurate in predicting localization needs for new images. This can be referred to as "over-fitting." Over-fitting may be addressed by using dropout layers. In embodiments, one or more dropout layers are used by a classifier.

In one example, two dropout layers are used. One dropout layer is implemented after the first hidden layer 414, and another dropout layer is implemented after the first fully-connected layer 424. The classifier can learn over time, for example using deep learning techniques over time, data to ignore in order to better generalize the model for future images. Although two dropout layers is generally discussed herein, any number of dropout layers can be implemented at various points of the transformation process shown in FIG. 4.

In some cases, "MaxPooling" layers may also be used to transform the image sizes using the trained model. As one example, three MaxPooling layers can be implemented as part of a transformation process that includes one or more steps shown in FIG. 4. MaxPooling layers can help reduce the size of the layers by selecting certain information to be retained during each MaxPooling layer. In one example, the MaxPooling layers can analyze a set of quadrants or areas for a layer and select the largest or most significant value for each quadrant or area, while the remaining values are not preserved for the next layer. In embodiments, each Max-Pooling layer can divide an image into nine portions and retain only the highest number, or the most unique or other type of number, for each of the nine portions. The Max-Pooling layers extract information, which may be the most useful or needed information.

As shown in FIG. 4, an output 428 can be generated from the layers, namely the hidden layers and the fully-connected layers. For example, a vector based on the second fully-connected layer 426 can be subjected to a sigmoid function to provide an output in between one and zero for each image used in the transformations. The output 428 can be a likelihood or a determination on whether each asset, represented as an image, should be localized or not before publication, such as a recommendation regarding each asset based on scores. An example of an output 428 is shown in FIG. 5. An output 428 could be received by a user device 110 in FIG. 1 from an ILC component 118 via a network 116, for example. In some cases, an output 428 can be used by an ILC component 118 to automatically exclude some assets from localization and advance them directly to publication in an automated workflow 100, and/or to automatically bundle other assets for localization.

FIG. 5 illustrates an example of an output 400 from a classifier, such as an ILC component 118 in FIG. 1. The ILC component 118 can perform actions, such as one or more transformations illustrated in the example in FIG. 4, to obtain an output (e.g., output 428 in FIG. 4). The output 500 shown in FIG. 5 can comprise a file or a user interface component that provides information about one or more assets. In some cases, output 500 is used by an automated workflow to automatically advance assets to publication or for localization. Data from output 500 can also be stored in a source repository component, such as source repository component 124 in FIG. 1.

As illustrated in FIG. 5, an output 500 can include a file column 510, which can identify each asset considered by an ILC component 118, for example. In some cases, each asset submitted or retrieved can be shown in file column 510. In other cases, an automated workflow may retrieve or add associated assets or images that are part of, or needed for, a first asset, and all of the associated assets can also be included in the list of files in file column 510. The output 500 may also include a status column 512 and a score column 514. The status of whether an asset is localizable or not in status column 512 can be based on the scores shown in score column 514. The scores in score column 514 can be outputs of a sigmoid function applied to a vector represented by a fully-connected layer, such as second fully-connected layer 426 in FIG. 4.

Continuing with FIG. 5, a first asset 516 is shown with a status of "Not Localizable," based on a score of 100% (or a probability of one of not meriting localization). A trained CNN-based classifier can be used by an ILC component 118 to subject the first asset 416 to transformations, such as the transformations shown in FIG. 4. The result of the transformations can provide the score for the asset shown in score column 514. For the first asset 516, the feature layers used during the transformations stored information that was highly relevant to eliminating the first asset 516 from localization. An automated workflow can automatically use the status and/or the score of each asset to determine whether to exclude the assets from localization. In some cases, an automated workflow system is configured to automatically exclude assets with certain scores, such as scores above 50% or 20%, from being bundled for localization. A system can set the status column 512 values based on the scores in score column 514, and based on the threshold scores or probabilities according to the system. In embodiments, a score above or below a threshold percent satisfies a condition, which indicates or causes a recommendation. For example, a second asset 518 is shown in FIG. 5, which a score of 0.01% or a near-zero probability of not meriting localization. The score fails to satisfy a condition of a threshold percentage score, which would have indicated the asset was "Not Localizable." Therefore, instead, the second asset 518 in FIG. 5 is designated as "Localizable." The second asset can be evaluated by the workflow to determine its target markets or languages, and batched for localization with other assets destined for the same location or use in the same languages.

In some cases, assets can be batched or bundled based on each destination, with a first bundle corresponding to a first language or location for localization and a second bundle for a second language or location. In other cases, bundles are only based on assets with identical language or location localization needs. A third asset 520 in FIG. 5 is also designated as "Localizable," based on a score of 0.0%. The second and third assets 518, 520 could be bundled together for localization, along with assets with higher percentage scores that are still designated as "Localizable," such as percentage scores above 10%.

Figure 6:
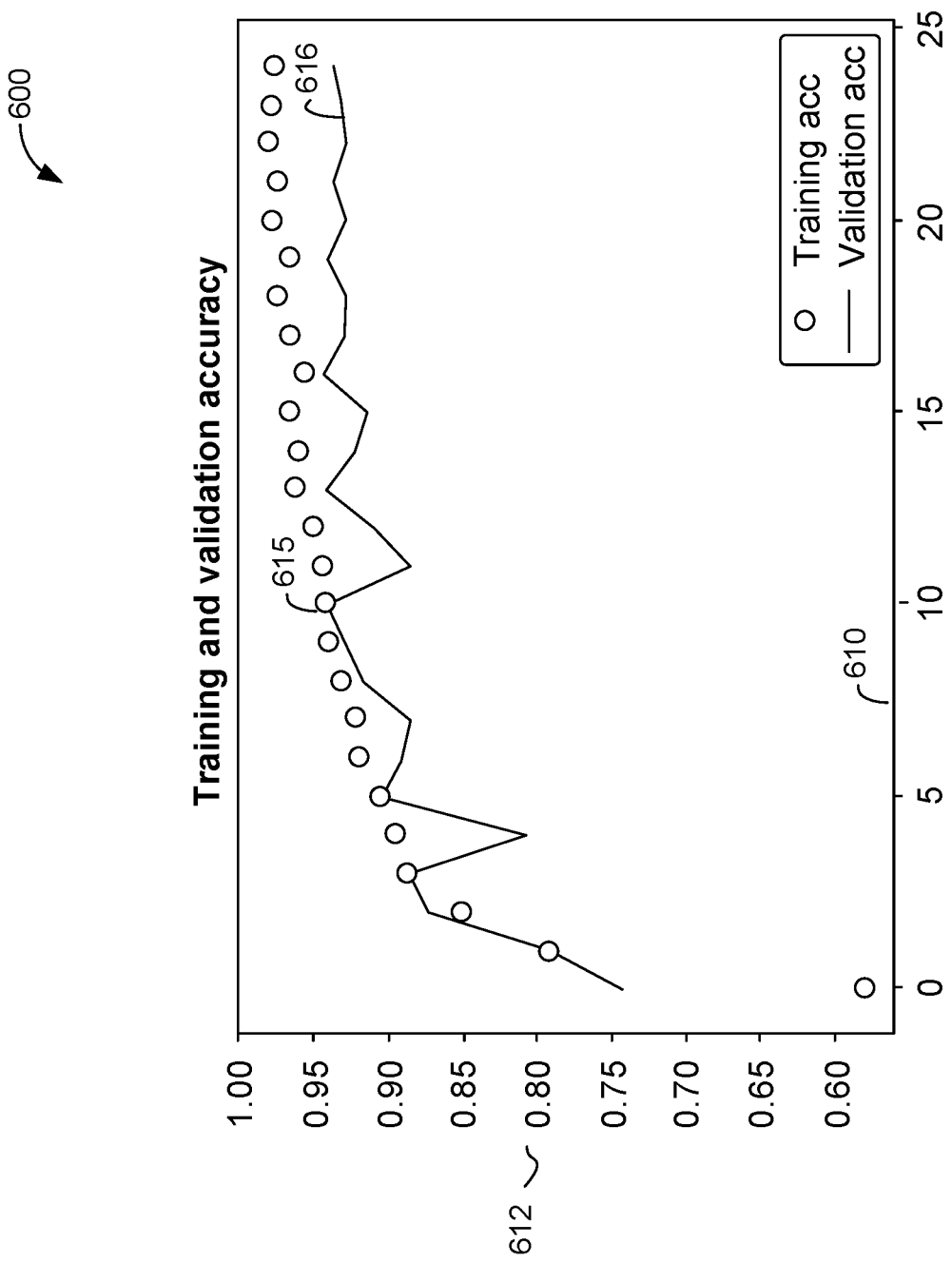
FIG. 6 depicts an example of a graph showing the accuracy of a classifier, which can be used with some implementations of the present disclosure, in accordance with various embodiments.

As described herein, a classifier can be used as part of a workflow, in order to exclude assets from localization. A CNN-based classifier, for example, can be trained in order for the classifier to learn the features to be extracted and stored with the images, and their weights, to be used with future images and determine localization probabilities. FIG. 6 illustrates an example of a graph 600 showing the accuracy of a classifier. In this example, the x-axis 610 of graph 600 can illustrate the increasing amount of known assets or images used with a classifier, shown in the hundreds or thousands. In some cases, an x-axis 610 can reflect time or system iterations used to train and verify a classifier. A y-axis 612 can reflect the percentage accuracy rate.

The graph 600 in FIG. 6 can include training data points 614 and validation data points 616. The training data points 614 can reflect the accuracy of the classifier with respect to the training data, such as a first set of input assets. The validation data points 616 can reflect the accuracy of the classifier with respect to the validation data points 616, which may be obtained using a second set of input assets. As illustrated in FIG. 6, classifier such as a CNN-based classifier used by an ILC component 118 can reach an accuracy rate above 90% in some cases. The graph 600 shows substantial improvements in accuracy for both the training data points 614 and validation data points 616, indicating the deep learning processes employed by the CNN model learned to recognize the context of assets using features.

FIG. 7 illustrates an example of a user interface 700 for using a classifier, for example for submitting information to an automated workflow that can perform an ILC job 316 as shown in FIG. 3. A user interface 700 can include or comprise a dashboard where an author can develop a construction, such as construction 710 in FIG. 7. In the specific example shown in FIG. 7, construction 710 relates to a job file ("JobFileList.csv") and a master file ("MasterFileList.csv"). Construction 710 indicates that a user ("j smith") has started a GitHub push, as shown by status 712 in FIG. 7. This can correspond to a Git submission, for example the Git.en component 310 in FIG. 3. The user interface 700 in FIG. 7 shows a status of a project, in this case construction 710.

Figure 8:
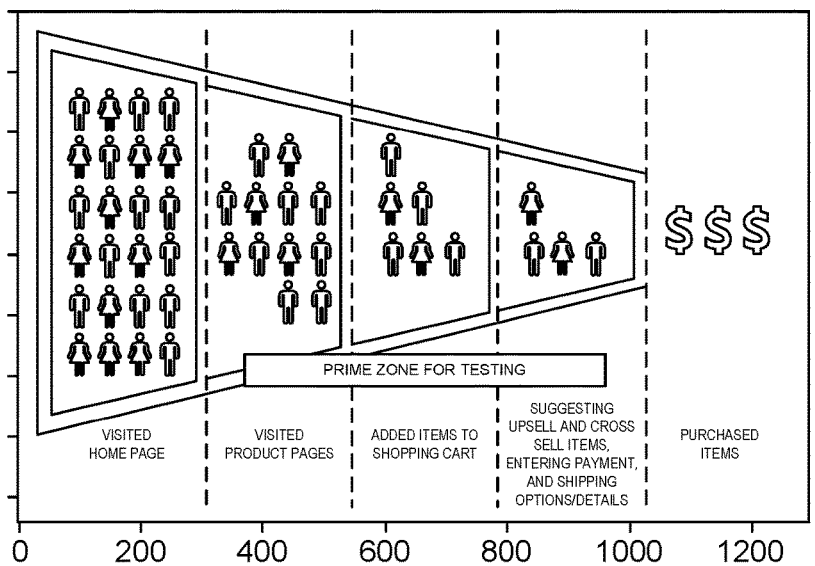
FIGS. 8 to 13 depict examples of test assets used with implementations of the present disclosure, in accordance with various embodiments.

FIGS. 8 through 13 are examples of assets used as test assets, shown with their respective scores according to an embodiment of systems described herein that classifies assets according to localizability. These can be examples of assets subjected to an ILC job 316, for example. The examples of assets in FIGS. 8 through 13 are illustrative only. As one example, a first test asset is shown in FIG. 8. The asset can be submitted or pulled in any format and treated as an image with particular pixel dimensions for analysis according to embodiments herein. The image corresponding to the asset can be a .png file or another time of file or graphic, and it can be adjusted to pixel dimensions or used within the pixel dimensions (with filler or null pixels). The pixel amounts described herein are not exact requirements, and multiples or other versions of the pixel amounts can be used, in some cases. The examples provided herein, for example in FIG. 4, may be a more efficient and accurate process for a classifier with respect to dimensions and values applied, based on testing and verification of the classifier.

The first test asset in FIG. 8 has a score of 20.80%, which can be determined to be "Localizable" according to the threshold values applied in embodiments. For example, the probability can be considered localizable because fails to satisfy a condition of a threshold percentage, because it is below 50%, or below 30%. In other words, an ILC component (e.g., ILC component 118) can use or comprise a CNN-based classifier, which has been trained using assets to learn the correct features to extract and the weights to apply to the features. This feature information is encoded into a feature layer, which is transformed into a fully-connected layer and used to generate the probability of localization being recommended. The classifier can use the context of the image to determine the features stored about the image, which have been found to be relevant to localization needs. As shown in the test assets in FIGS. 8 to 13, embodiments of an ILC component 118 as described herein can determine the context of objects or shapes represented by pixels of the assets. For example, embodiments can encode as features in association with hidden layers based on an image representing the asset in FIG. 8. An ILC component 118 can be trained to determine features that indicate the context of objects, in order to determine localizability based on the features. As mere examples, a classifier can be trained to identify and weigh context, such as context indicating marketing or form objects, and/or objects that are not logos, storefronts, embedded in photographs, etc.

Even though characters and/or symbols may be included in the asset, a classifier is trained to determine these are objects that do not merit localization in this context. For example, objects may be used as graphics and not to communicate or convey meaning with text to a reader, which the classifier learns to determine. The test assets include examples of assets that a conventional system (for example a system merely using OCR) may not have excluded, because alphabet characters would have been recognized. On the other hand, in embodiments described herein, the context of the fourth test asset as determined and stored as features by a classifier enable the removal of the fourth test asset from a list, to reduce the localization workload. For example, a classifier may learn and apply features corresponding to context, such as objects in the asset being embedded in a photograph, and/or objects determined to be captured within an image due to their depth or skewed perspective. Such features can be extracted and stored by a classifier and used to weigh against recommending localization.

Figure 9:
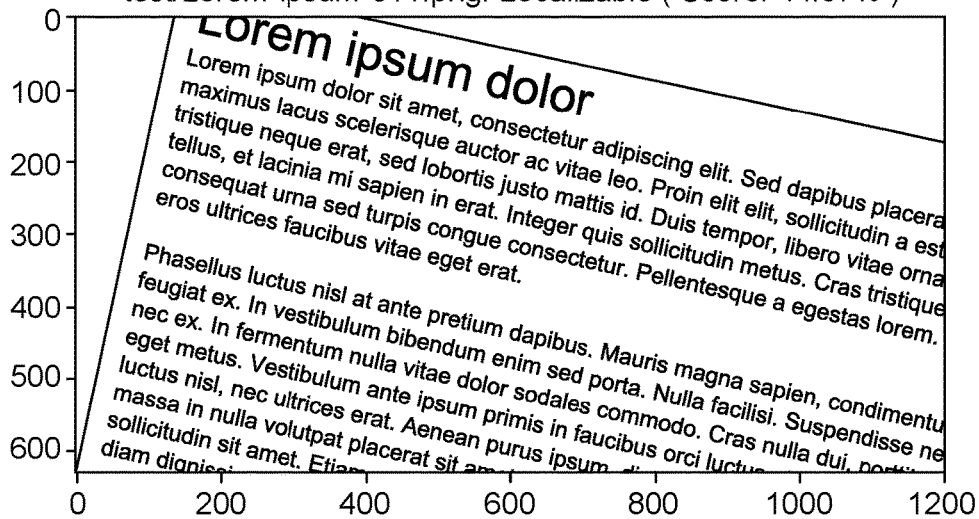

Another test asset is shown in FIG. 9, for example. The test asset in FIG. 9 has a score below 50%, but higher than 0.0%. Here the asset is still designated as "Localizable," indicating the embodiment used with respect to FIG. 9 determined whether a condition was satisfied, where the condition was having a threshold score of approximately 50%. The test asset in FIG. 9, with a score of 44.97%, is considered localizable because the score is below 50%, or 70%, etc., and does not satisfy the condition. Here the probability is not as definitive as the probability for the second test asset, but it is certain enough to recommend not to exclude the third test asset from localization. In embodiments, a classifier has learned to exclude or not count the text objects "lorem ipsum" as recommended for localization, for example.

Figure 10:
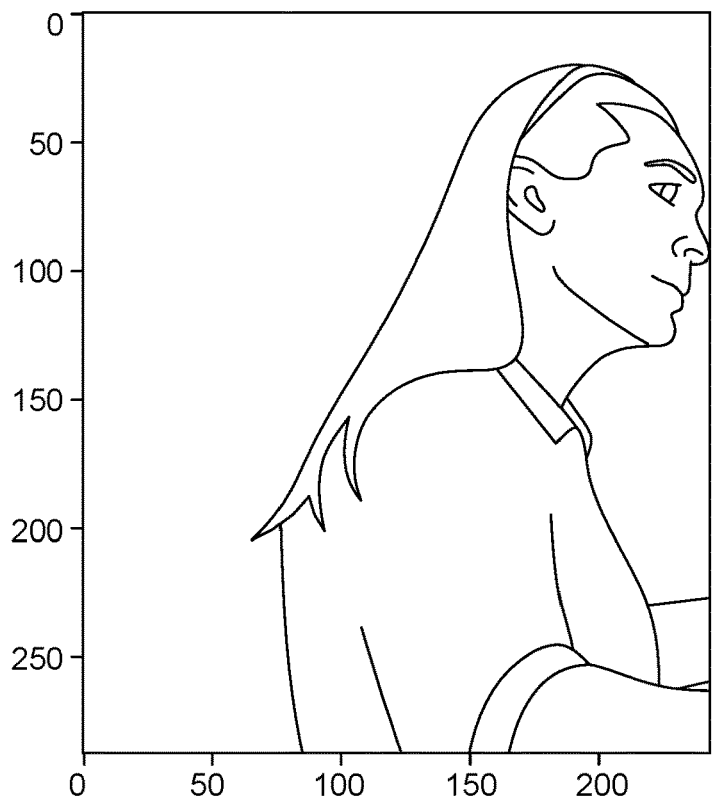

FIG. 10 illustrates another test asset with a score of 100.00% and found "Not Localizable." The terms "Localizable" and "Not Localizable" in various illustrations of test assets can indicate an asset is recommended for a localization process or not, for example. In some cases, the asset illustrated in FIG. 10 is a photograph. In embodiments, a trained classifier can determine certain features are features in a photographic representation, such as text on clothing, that does not indicate localization is recommended. For example, objects made up of pixels are identified by a neural-network-trained classifier. In the example in FIG. 10, all of the features in the image indicate localization is not recommended, resulting in a score of 100.00%. In some cases, assets recommended as "Localizable" are automatically batched and forwarded or sent for localization as part of an automated workflow, while assets such as the example in FIG. 10 can be excluded.

Figure 11:
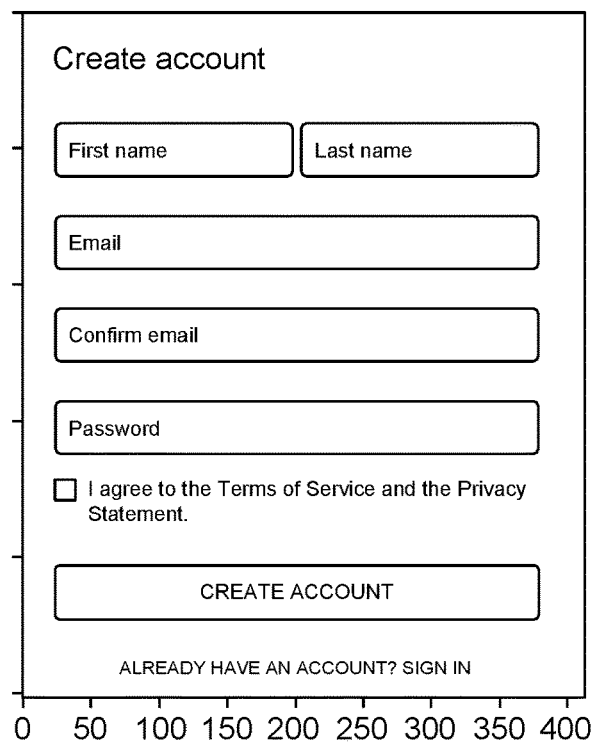

Continuing to FIG. 11, a further test asset is shown. The score for the test asset in FIG. 11 is 0.00%, and it is designated as "Localizable." In other words, the test asset in FIG. 11 was determined by a classifier to be localizable, or recommended for a localization process, with a high degree of certainty. A neural-network-based classifier accurately identified that this asset should not be excluded from localization, which is consistent with the contexts of the objects within the asset. For example, the test asset in FIG. 11 contains text that is likely essential to an end user and from an organization (and not used in a logo or within a photograph, for example), and the classifier is able to identify various features of the test asset that overwhelmingly indicate this asset should be localized. As described herein, a neural-network-based classifier learns features to determine from the pixels of each image, for example sixty-four features, in embodiments. Overall, the context of the shapes or objects in the asset shown in FIG. 11 was found to indicate, via extracted features, that the asset contains objects to be localized. In some cases, a classifier can learn from the context of the image indicating a logo or storefront is at issue, or an embedded photograph or a spatially skewed image is present, among other features indicating context of objects in the image. The classifier can select the features and apply learned weights to the features, in embodiments.

Figure 12:
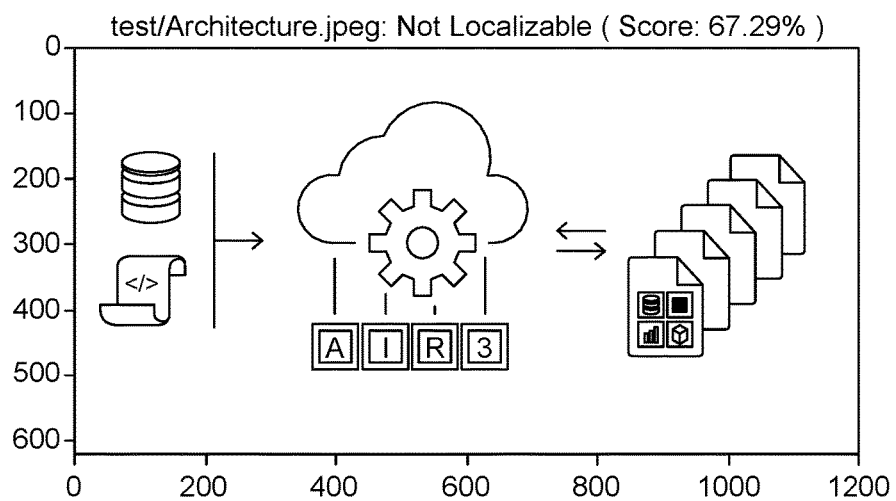

In FIG. 12, an asset has been recommended as "Not Localizable," with a score above 50%, as one example of a threshold used in some cases. Embodiments may be more accurate when scores below 50% are considered "Localizable" and scores above 50% are considered "Not Localizable," or not recommended to be subject to localization for one or more other locations. For example, when a system or author generates an asset, it can be considered localized for a home or default, or first, location. Any localization applied to the asset can relate to a second location, or to a group of locations. In embodiments, localization can be for a second language or dialect, or for a second geographic location, for example.

In some cases, conventional technologies, such as an OCR system, may have technological limitations due to the background color or pattern, or lack of contrast. Embodiments described herein may analyze features of images, and do not rely on scanning for text. In some cases, the context of objects within assets may indicate third-party materials, brand or trade names, or proprietary or other specific objects that should not be localized. Even though an asset may comprise a photograph (which was not found localizable), a classifier can also identify other features such as a menu or selectable objects, in context. For example, a first feature layer may indicate more individual objects, such as letters or words, while a later feature layer (after transformation(s)) can indicate objects at a higher level of abstraction, taking into account context. In the example in FIG. 11, for instance, the context may relate to a menu or selectable text objects, or to names of links, which can weigh in favor of localization.

Figure 13:
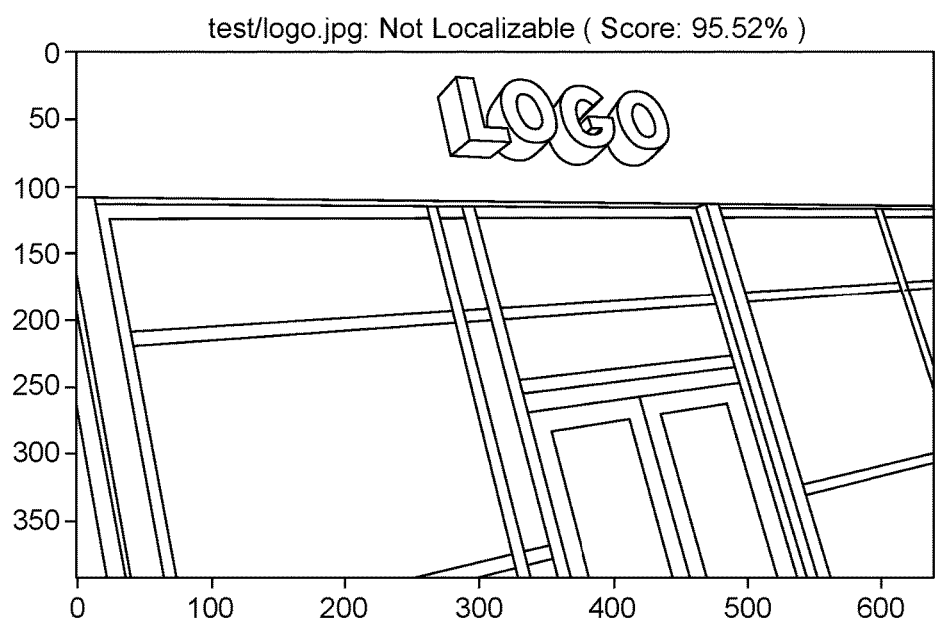

Turning to FIG. 13, a test asset is shown, found not to be recommended for localization. Although the assets may include characters, embodiments can determine the objects in the assets are used as images or graphics instead of as readable text, for example. Or embodiments can use pixels to determine the objects are part of a photograph or in a context where treating the objects for localization is not recommended. During training, a neural-network-based classifier learns various features that are relevant to deciding whether localization is proper or not.

Figure 14:
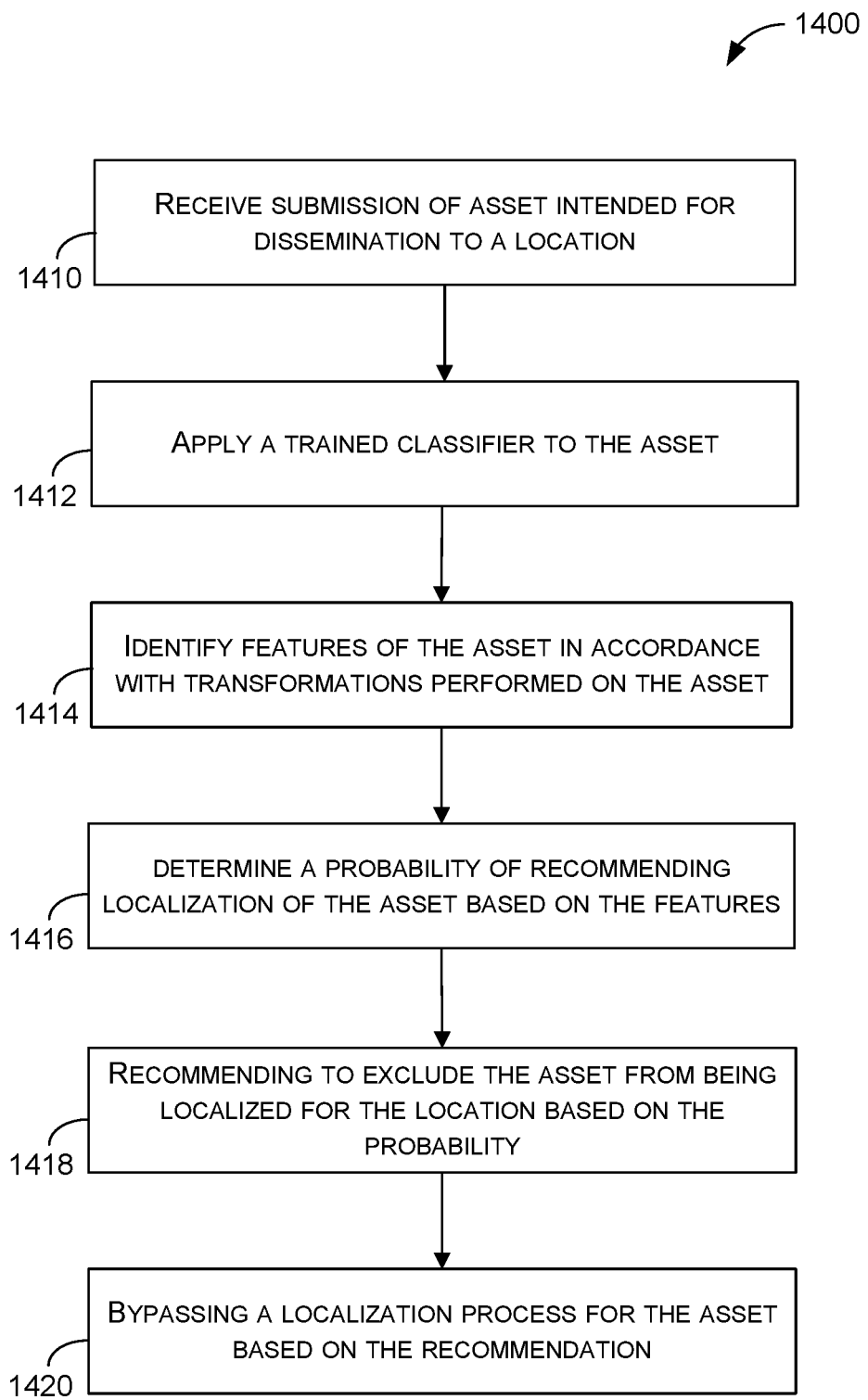
FIG. 14 shows a flow diagram depicting an example of steps associated with some implementations of the present disclosure, in accordance with various embodiments.

Turning to FIG. 14, a flow diagram 1400 is shown, illustrating one or more steps or processes in accordance with embodiments. At 1410, a submission is received of an asset intended for dissemination to another location or to one or more particular locations. In embodiments, an initial asset may be considered localized for a first or default location, or in some cases an initial asset may not be considered or identified as localized for a certain location unless it has been subjected to a localization process. At 1412, a trained classifier, such as an ILC component 118, is applied to the asset. At 1414, features of the asset are identified based on transformations performed on the asset, such as one or more hidden layers as described herein. At 1416, a probability of recommending localization is determined based on the features. The features can store information about objects in context, with the context aiding the determination of whether to recommend localization. At 1418, it is recommended to exclude the asset from being localized for one or more additional locations (such as local office of a company, or markets where an organization operates), based on the probability. At 1420, a localization process is bypassed for the asset based on the recommendation. For example, the process can be automatically bypassed in a workflow so that an asset is pushed for earlier publication or dissemination, or an entity can use the recommendations to implement a bypass of the process.

Figure 15:
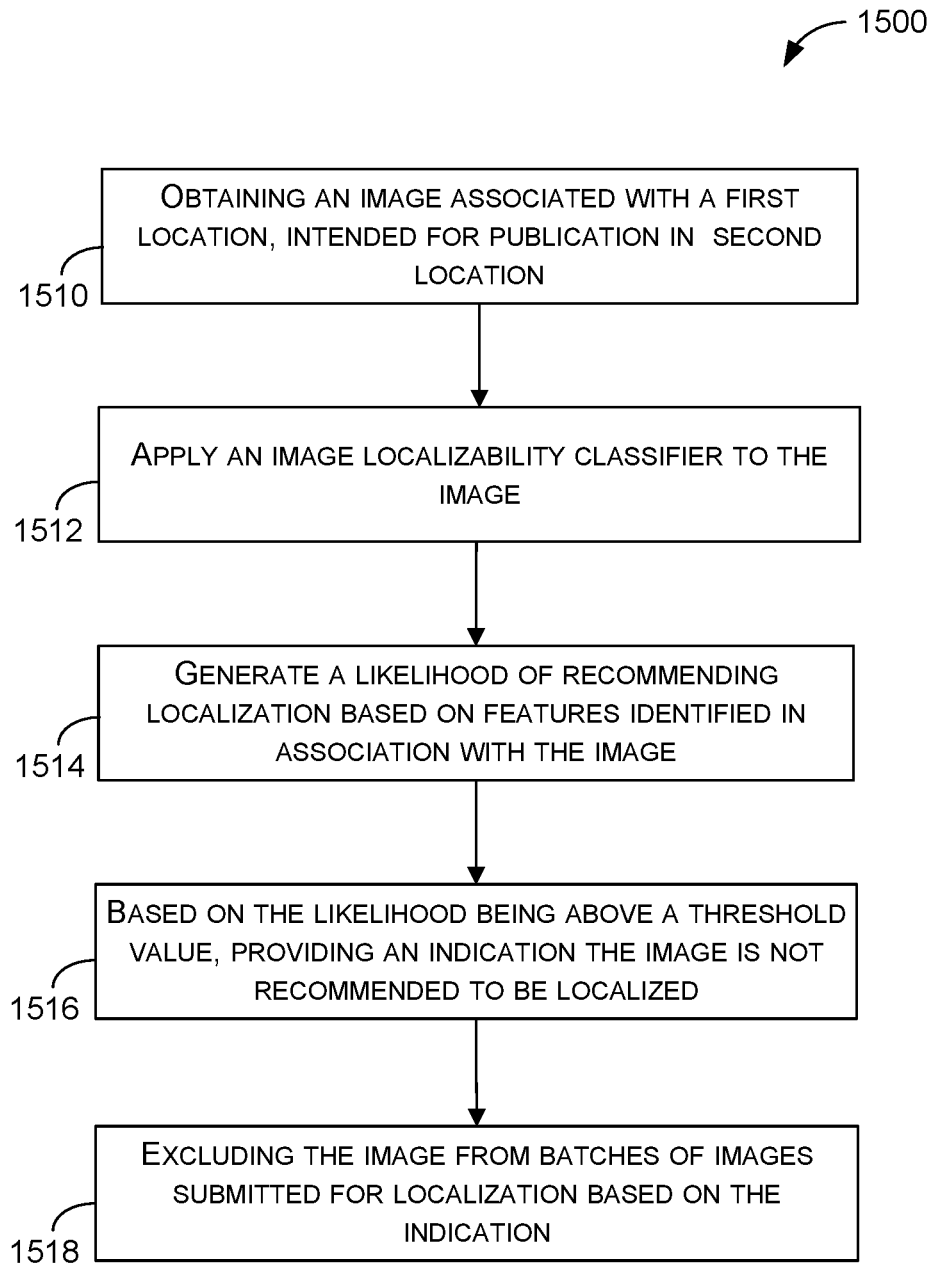
FIG. 15 shows a flow diagram depicting an example of steps associated with some implementations of the present disclosure, in accordance with various embodiments.

FIG. 15 illustrates another flow diagram 1500 with one or more steps or processes that may be used in accordance with embodiments. At 1510, an image is obtained associated with a first location, such as a main or default location. In embodiments, instead of a location, the image may be associated with a first language or dialect, or target market or demographic, and the classifier may determine if the image is recommended for localization to a second (or several other) languages or dialects, or target markets or demographics. At 1512, an image localizability classifier is applied to the image, which can be treated or represented as an image with particular pixel dimensions. At 1514, a likelihood of recommending localization is generated, based on features identified in association with the image. At 1516, based on the likelihood being above a threshold value, (e.g., 50%) an indication is provided that the image is not recommended to be localized. At 1518, the image is excluded from batches of images submitted for localization, based on the indication.

Figure 16:
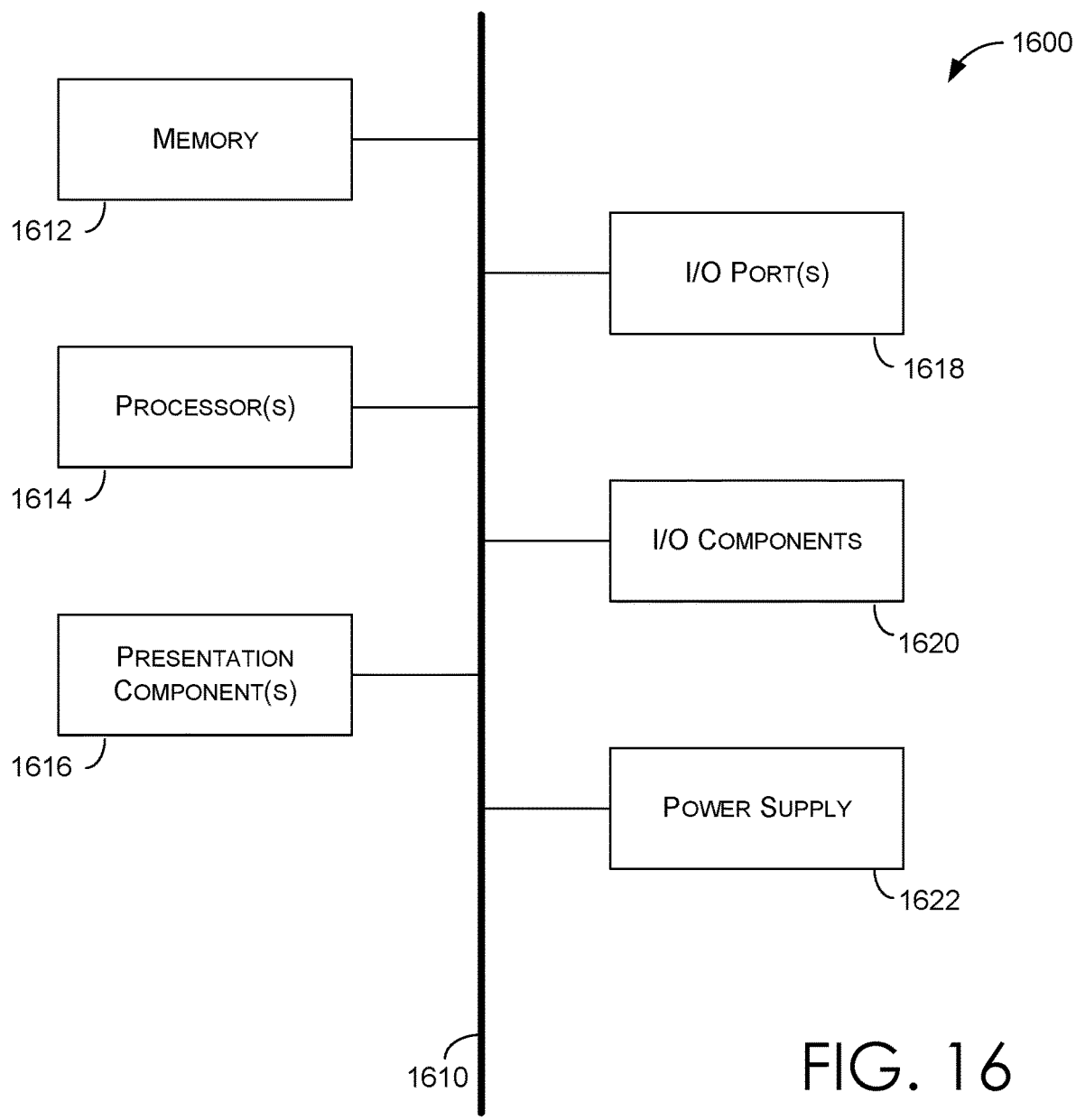
FIG. 16 provides an example of a computing device in which embodiments of the present invention may be employed.

FIG. 16 provides an example of a computing device in which embodiments of the present invention may be employed. Computing device 1600 includes bus 1610 that directly or indirectly couples the following devices: memory 1612, one or more processors 1614, one or more presentation components 1616, input/output (I/O) ports 1618, input/output components 1620, and illustrative power supply 1622. Bus 1610 represents what may be one or more busses (such as an address bus, data bus, or combination thereof). Although the various blocks of FIG. 16 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 16 is merely illustrative of an exemplary computing device that can be used in connection with one or more embodiments of the present invention. Distinction is not made between such categories as "workstation," "server," "laptop," "handheld device," etc., as all are contemplated within the scope of FIG. 16 and reference to "computing device."

Computing device 1600 typically includes a variety of computer-readable media. Computer-readable media can be any available media that can be accessed by computing device 1600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1612 includes computer storage media in the form of volatile and/or nonvolatile memory. As depicted, memory 1612 includes instructions 1624. Instructions 1624, when executed by processor(s) 1614 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 1600 includes one or more processors that read data from various entities such as memory 1612 or I/O components 1620. Presentation component(s) 1616 present data indications to a user or other device. Exemplary presentation components include a display device, speaker, printing component, vibrating component, etc.

I/O ports 1618 allow computing device 1600 to be logically coupled to other devices including I/O components 1620, some of which may be built in. Illustrative components include a microphone, joystick, game pad, satellite dish, scanner, printer, wireless device, etc. I/O components 1620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 1600. Computing device 1600 may be equipped with depth cameras, such as stereoscopic camera systems, infrared camera systems, RGB camera systems, and combinations of these, for gesture detection and recognition. Additionally, computing device 1600 may be equipped with accelerometers or gyroscopes that enable detection of motion. The output of the accelerometers or gyroscopes may be provided to the display of computing device 1600 to render immersive augmented reality or virtual reality.

Embodiments presented herein have been described in relation to particular embodiments, which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method, comprising:
receiving a submission of an asset localized for a first location and intended for dissemination to a second location, wherein the asset comprises an image with a first set of pixel dimensions;
applying a trained neural network to the asset to determine a probability of recommending localization of the asset for the second location based on a plurality of features, the plurality of features identified in accordance with a plurality of transformations performed on the asset via the trained neural network, wherein the plurality of transformations includes transforming the image into a first hidden layer with a second set of pixel dimensions, wherein the first hidden layer includes a first feature layer, and the plurality of transformations further includes transforming the first hidden layer into a second hidden layer with a third set of pixel dimensions and a second feature layer; and
responsive to determining that the probability satisfies a condition, providing a recommendation to exclude the asset from being localized to the second location.

2. The computer-implemented method of claim 1, wherein the trained neural network is an image localizability classifier.

3. The computer-implemented method of claim 1, wherein the plurality of transformations further includes transforming the second hidden layer using a third hidden layer comprising a third feature layer, wherein the third feature layer indicates the plurality of features.

4. The computer-implemented method of claim 3, wherein the third feature layer indicates the plurality of features by transformation into one or more fully-connected layers used to generate a vector representing the plurality of features.

5. The computer-implemented method of claim 4, wherein the vector representing the plurality of features is a vector through a set of nodes associated with the plurality of features.

6. The computer-implemented method of claim 1, wherein the second feature level indicates the asset is a logo or storefront.

7. The computer-implemented method of claim 1, wherein the condition is a score above a threshold.

8. A non-transitory computer-readable storage medium storing computer-executable instructions that, when executed by a processing device, cause the processing device to:
receive a submission of an asset localized for a first location and intended for dissemination to a second location, wherein the asset comprises an image with a first set of pixel dimensions;
apply a trained neural network to the asset to determine a probability of recommending localization of the asset for the second location based on a plurality of features, the plurality of features identified in accordance with a plurality of transformations performed on the asset via the trained neural network;
transform the image into a first hidden layer with a second set of pixel dimensions, wherein the first hidden layer includes a first feature layer, and the plurality of transformations further includes transforming the first hidden layer into a second hidden layer with a third set of pixel dimensions and a second feature layer; and
responsive to determining that the probability satisfies a condition, provide a recommendation to exclude the asset from being localized to the second location.

9. The non-transitory computer-readable storage medium of claim 8, wherein the trained neural network is an image localizability classifier.

10. The non-transitory computer-readable storage medium of claim 8, wherein the plurality of transformations further includes transforming the second hidden layer using a third hidden layer comprising a third feature layer, wherein the third feature layer indicates the plurality of features.

11. The non-transitory computer-readable storage medium of claim 10, wherein the third feature layer indicates the plurality of features by transformation into one or more fully-connected layers used to generate a vector representing the plurality of features.

12. The non-transitory computer-readable storage medium of claim 11, wherein the vector representing the plurality of features is a vector through a set of nodes associated with the plurality of features.

13. The non-transitory computer-readable storage medium of claim 8, wherein the feature level indicates the asset is a logo or storefront.

14. The non-transitory computer-readable storage medium of claim 8, wherein the condition is a score above a threshold.

15. A computing system comprising:
   means for receiving a submission of an asset localized for a first location and intended for dissemination to a second location, wherein the asset comprises an image with a first set of pixel dimensions;
   means for applying a trained neural network to the asset to determine a probability of recommending localization of the asset for the second location based on a plurality of features, the plurality of features identified in accordance with a plurality of transformations performed on the asset via the trained neural network, wherein the plurality of transformations includes transforming the image into a first hidden layer with a second set of pixel dimensions, wherein the first hidden layer includes a first feature layer, and the plurality of transformations further includes transforming the first hidden layer into a second hidden layer with a third set of pixel dimensions and a second feature layer; and
   means for providing a recommendation to exclude the asset from being localized to the second location, responsive to determining that the probability satisfies a condition.

16. The computing system of claim 15, wherein the condition is a score above a threshold.

17. The computing system of claim 15, wherein the plurality of transformations further includes transforming the second hidden layer using a third hidden layer comprising a third feature layer, wherein the third feature layer indicates the plurality of features.

18. The computing system of claim 17, wherein the third feature layer indicates the plurality of features by transformation into one or more fully-connected layers used to generate a vector representing the plurality of features.

19. The computing system of claim 18, wherein the vector representing the plurality of features is a vector through a set of nodes associated with the plurality of features.

20. The computing system of claim 15, wherein the feature level indicates the asset is a logo or storefront.

* * * * *